United States Patent [19]
Kim

[11] Patent Number: 5,963,592
[45] Date of Patent: Oct. 5, 1999

[54] ADAPTIVE CHANNEL EQUALIZER FOR USE IN DIGITAL COMMUNICATION SYSTEM UTILIZING OFDM METHOD

[75] Inventor: Young-Sang Kim, Seoul, Rep. of Korea

[73] Assignee: Daewoo Electronics Co., Ltd., Seoul, Rep. of Korea

[21] Appl. No.: 08/982,222

[22] Filed: Dec. 1, 1997

[30] Foreign Application Priority Data

Dec. 28, 1996 [KR] Rep. of Korea ...................... 96-75561

[51] Int. Cl.⁶ ............................... H03H 7/30; H03H 7/40
[52] U.S. Cl. ......................... 375/232; 375/235; 708/323; 370/210; 370/480
[58] Field of Search ................................... 375/229, 232, 375/233, 235, 236; 708/322, 323; 370/480, 210, 479, 203, 206

[56] References Cited

U.S. PATENT DOCUMENTS

| | | | |
|---|---|---|---|
| 5,502,507 | 3/1996 | Kim | 375/232 |
| 5,524,125 | 6/1996 | Tsujimoto | 375/232 |
| 5,682,376 | 10/1997 | Hayashino et al. | 370/206 |
| 5,812,523 | 9/1998 | Isaksson et al. | 370/208 |
| 5,818,813 | 10/1998 | Saito et al. | 370/208 |

*Primary Examiner*—Chi H. Pham
*Assistant Examiner*—Bryan Webster
*Attorney, Agent, or Firm*—Pillsbury Madison & Sutro LLP

[57] ABSTRACT

An adaptive channel equalizer for use in OFDM receiver is disclosed. The adaptive channel equalizer comprises a first complex multiplier for outputting a first in-phase complex multiplication signal and a first quadrature phase complex multiplication signal; a reference signal generator for generating a reference signal; an error calculator for outputting an in-phase error signal and a quadrature phase error signal; a delay unit for outputting an in-phase delay signal and a quadrature phase delay signal; a gain controller for outputting an in-phase gain control signal and a quadrature phase gain control signal; a second complex multiplier for outputting a second in-phase complex multiplication signal and a second quadrature phase complex multiplication signal; an adder for outputting updated in-phase and quadrature phase coefficients; an address generator for generating a write address signal and a read address signal; a storage unit for storing the updated in-phase and quadrature phase coefficients, and outputting the updated coefficients; an initial coefficients generator for generating an initial coefficients; a selecting signal generator for generating a selecting signal; and a multiplexing unit for selecting one of the initial coefficients and the updated coefficients according to the selecting signal.

5 Claims, 6 Drawing Sheets

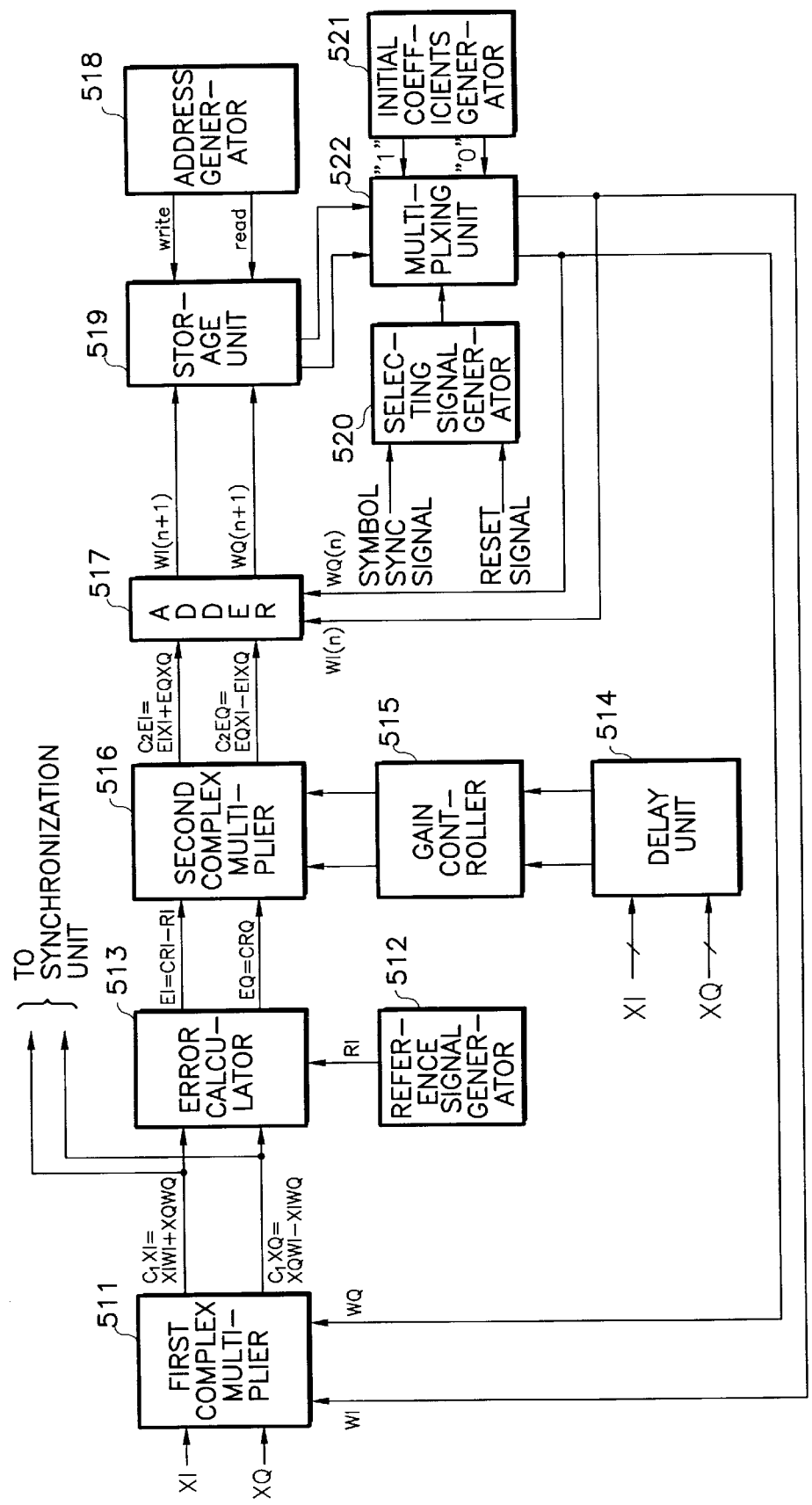

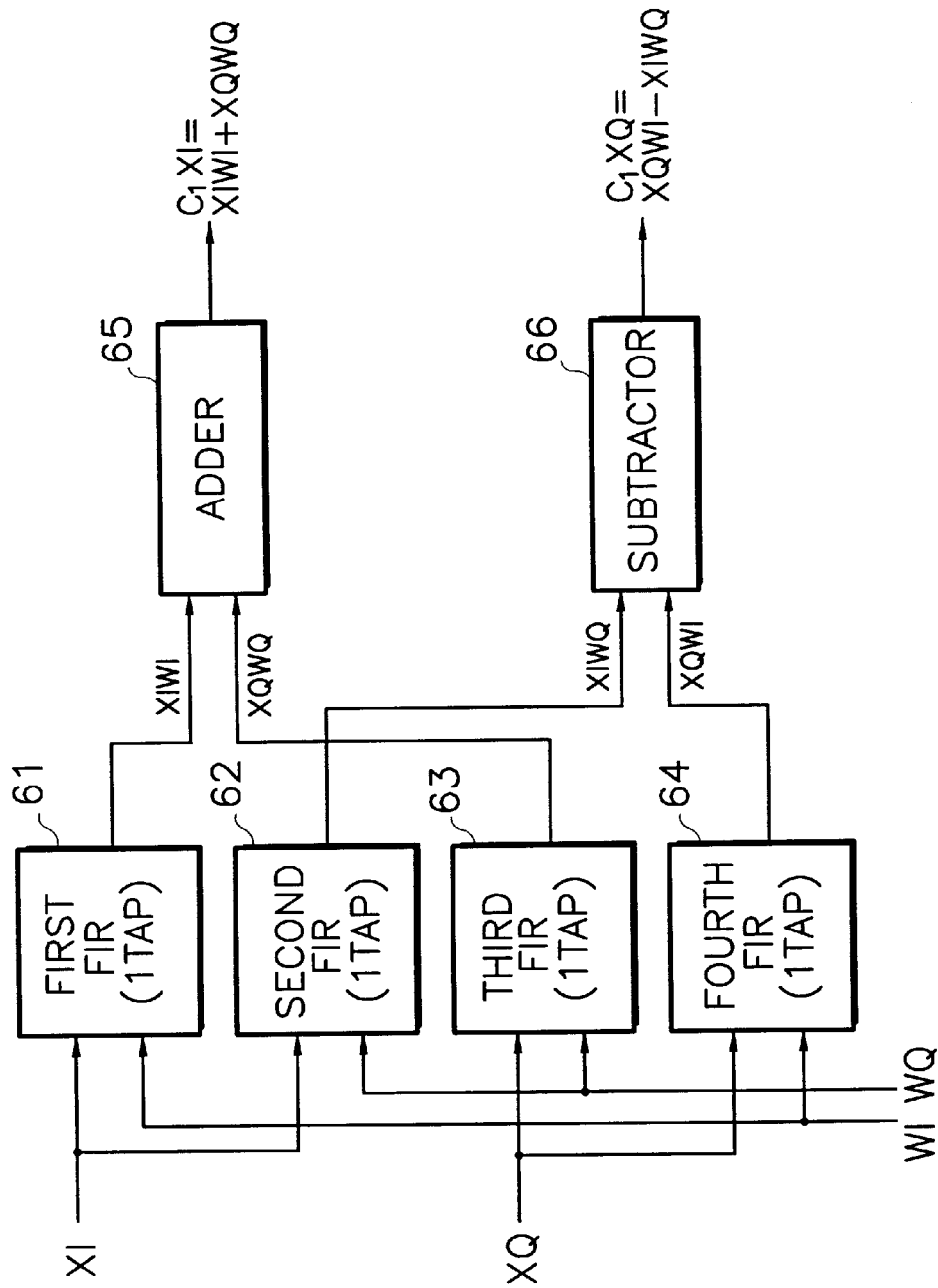

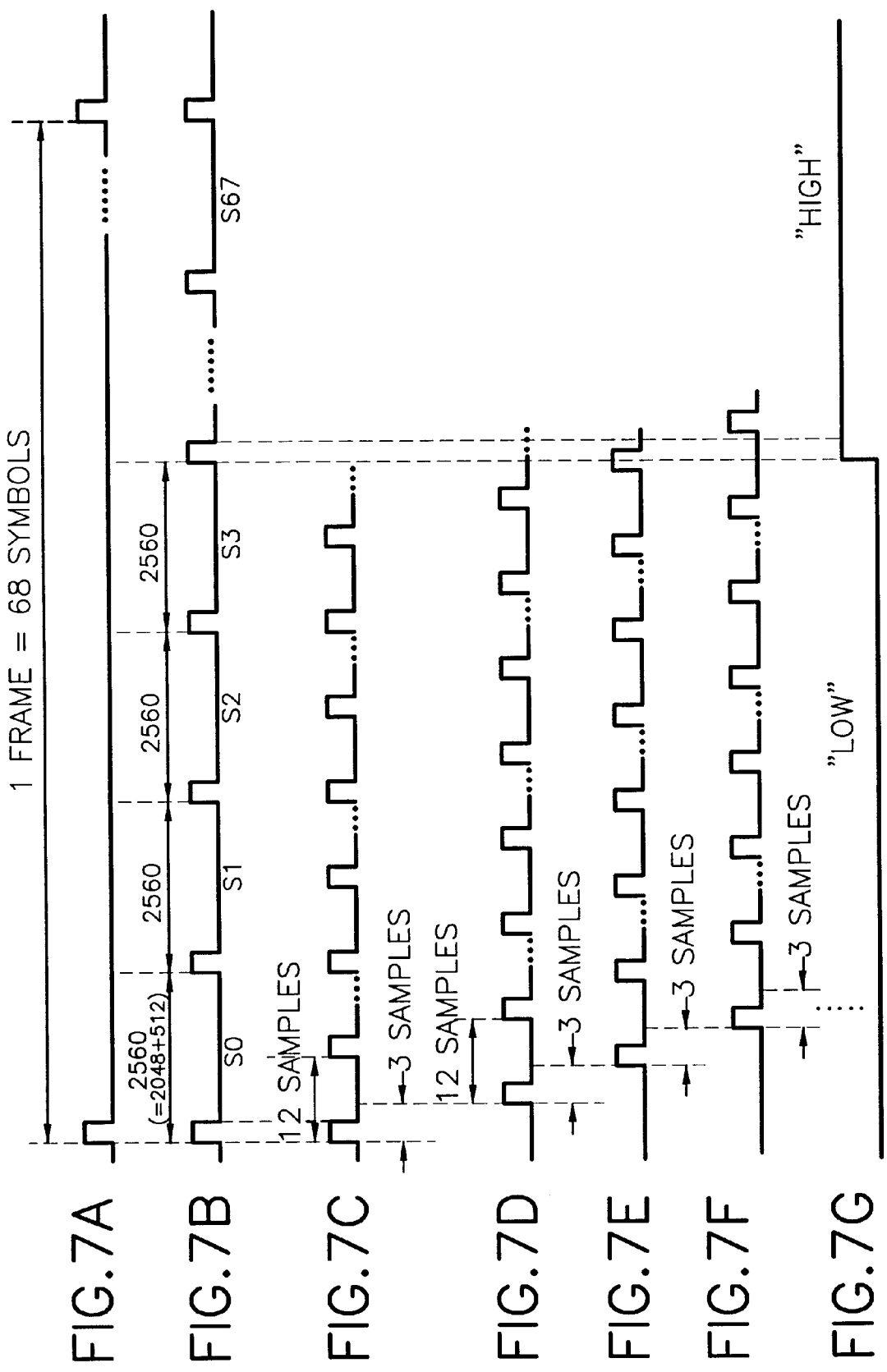

ADAPTIVE CHANNEL EQUALIZER FOR USE IN DIGITAL COMMUNICATION SYSTEM UTILIZING OFDM METHOD

BACKGROUND OF THE INVENTION

1. Field of the Invention

The present invention relates to a receiver in a digital communication system utilizing an Orthogonal Frequency Division Multiplexing (OFDM) method, and more particularly to an adaptive channel equalizer for equalizing adaptively a received OFDM signal according to channel fluctuation by using a pilot signal, to remove an inter-sample interference within symbol, that is, intra-symbol interference.

2. Description of the Prior Art

In a wireless communication channel and digital high-definition TV (HDTV) transmission channel, it is known that an Inter-Symbol Interference (ISI) caused by multi-path fading in a received signal commonly occurs. Particularly, when data for HDTV are transmitted through the channel at high speed, the ISI increases causing errors to be generated during the data recovery at the receiving side. To solve this problem, recently, OFDM method has been proposed as a transmission method for use in the Digital Audio Broadcasting (DAB) and Digital Terrestrial Television Broadcasting (DTTB) standards.

In OFDM method, serially-inputted symbol streams are divided into a predetermined unit block. The divided symbol streams of each unit block are converted into N number of parallel symbols. The N number of parallel symbols are multiplexed and added by using a plurality of subcarriers having different frequencies, respectively, according to Inverse Fast Fourier Transform (IFFT) algorithm. The added data are transmitted via the channel. That is, the N number of parallel symbols are defined as one unit block, and each subcarrier of the unit block has an orthogonal characteristic, which does not have an influence on subchannels. Compared to a conventional single carrier transmission method, OFDM method can reduce the ISI caused by the multi-path fading by maintaining the same symbol transmission rate and increasing symbol period as much as by the number of subchannels (N). Especially, in OFDM method, a guard interval (GI) is inserted between the transmitted symbols to enhance the capability of the ISI reduction, making it possible to realize a simplified structure of channel equalizer. In contrast to a conventional Frequency Division Multiplexing (FDM) type, OFDM method has a characteristic that spectrums of each subchannel are superimposed causing it to have a higher band efficiency. Further, the spectrum has a wave of rectangular shape and electric power is uniformly distributed at each frequency band, which prevents from being affected by the same channel interference. The OFDM method is commonly combined with modulation types such as Pulse Amplitude Modulation (PAM), Frequency Shift Keying (FSK), Phase Shift Keying (PSK), and Quadrature Amplitude Modulation (QAM).

FIG. 1 shows a format diagram of a transmission symbol having the guard interval in an OFDM communication system. Each symbol transmitted from a transmitting side comprises an useful part and the guard interval. The useful part contains useful OFDM samples, and the guard interval is inserted in its front end for dividing OFDM samples into symbol units. The guard interval copies and utilizes samples located within the lower portion of the useful part.

FIG. 2 shows the removal of the ISI by inserting the guard interval. When the guard interval is inserted between continuous useful parts, as shown in FIG. 1, a received signal is not affected by an echo signal. That is, the ISI caused by the multi-path having the shorter length than the guard interval can be removed.

As described above, the ISI caused by the multi-path fading is removed with ease, by using the guard interval inserted between transmission symbols, however, the intra-symbol interference is difficult to be removed, in OFDM method. Hence, in the receiving side of the OFDM communication system, a specific channel equalizer for removing the intra-symbol interference is required. The channel equalizer should detect and remove a distortion generated according to varying channel environment since each sample within symbol has different subcarriers.

In OFDM method, Pilot Symbol Insertion (PSI) method, which is still undergoing further developments, can be proposed as an efficient channel equalization method. In the PSI method, when a pilot symbol is transmitted periodically from the transmitting side, the receiving side knows the transmission time of the pilot symbol in advance, and decodes the transmitted pilot symbol to estimate the distortion caused by the channel environment. On the basis of an estimated value, distortion in the useful data symbol is compensated.

Here, increased number of pilot symbols decreases the transmission rate of the useful data symbol. Therefore, the number of pilot symbol should be decreased to an appropriate number for performing the exact channel estimation.

FIGS. 3A to 3B are frame structural diagrams for describing a channel equalization method according to a conventional PSI method. Here, H(n, k) represents a transfer function for the k-th sample within the n-th symbol.

FIG. 3A shows a structural diagram for allocating pilot cells to all samples within one symbol along the time axis. Namely, the pilot symbol is inserted in each T-th symbol along the time axis, and here it is inserted in each T=16-th symbol. In this method, it is important to select a T-parameter corresponding to the time variation of a channel. This method uses channel transfer functions H(n, k) and H(n+T, k) for pilot symbols n and n+T, and detects channel transfer functions for T-1 number of useful data symbols between two pilot symbols by interpolation. At this time, a great deal of memories for storing (T-1) number of useful data symbols, are required, and the economical factor of having such amount of memory makes this method difficult from being realized.

FIG. 3B shows a structure of the pilot cell inserted periodically at each T=4-th symbol along the time axis by allocating the pilot cell at intervals of 16-th sample within the symbol and 4 number of sample between adjacent symbols along the frequency axis. This structure uses minimum pilot cells by applying a sampling theory, and has a characteristic that adapts to the Doffler Effects. The structure illustrated in FIG. 3B, comparing it to that of FIG. 3A, the pilot cell insertion period is short and only T-1=3 symbols are stored, decreasing the memory capacity, making it possible to implement interpolation in a hardware, which is known to have been applied in STERNE equipment. In addition, using boosted pilot cell requiring a higher electric power than the useful data symbol, decreases noises for an accurate estimation of channels.

The conventional channel equalization method illustrated in FIGS. 3A to 3B, inserts periodically the pilot cell in some samples (subcarrier channel) in each symbol, obtains the transfer function of the channel by using the pilot cell, and the transfer functions of the remaining channels by using an interpolation technique. However, for OFDM signal, the channel estimation method implemented by the interpolation technique has a problem that it does not adapt to abrupt changes in the channel environment.

SUMMARY OF THE INVENTION

In view of the foregoing, it is an object of the present invention to provide an adaptive channel equalizer for equalizing adaptively a received OFDM signal according to channel fluctuation by using a pilot signal, to remove the intra-symbol interference, in a receiver of a digital communication system utilizing the OFDM method.

In order to achieve the above object, the present invention provides an adaptive channel equalizer for use in a digital communication system utilizing the OFDM method comprising: a first complex multiplier for outputting a first in-phase complex multiplication signal and a first quadrature phase complex multiplication signal by performing a complex multiplication for received in-phase and quadrature phase channel signals, and the in-phase and quadrature phase coefficients; a reference signal generator for generating a reference signal; an error calculator for outputting an in-phase error signal and a quadrature phase error signal by calculating a phase error from the first in-phase and quadrature phase complex multiplication signals and the reference signal; a delay unit for outputting an in-phase delay signal and a quadrature phase delay signal by delaying the received in-phase and quadrature phase channel signals; a gain controller for outputting an in-phase gain control signal and a quadrature phase gain control signal by controlling a gain of the in-phase and quadrature phase delay signals; a second complex multiplier for outputting a second in-phase complex multiplication signal and a second quadrature phase complex multiplication signal by performing a complex multiplication for the in-phase and quadrature phase error signals, and the in-phase and quadrature phase gain control signals; an adder for outputting updated in-phase and quadrature phase coefficients after adding respectively the second in-phase and quadrature phase complex multiplication signals and the in-phase and quadrature phase coefficients; an address generator for generating a write address signal and a read address signal; a storage unit for storing the updated in-phase and quadrature phase coefficients according to the write address signal, and outputting the updated coefficients stored according to the read address signal; an initial coefficients generator for generating an initial coefficients; a selecting signal generator for generating a selecting signal according to a symbol sync signal; and a multiplexing unit for selecting one of the initial coefficients and the updated coefficients from the storage unit according to the selecting signal.

BRIEF DESCRIPTION OF THE DRAWINGS

The above and other objects, features, and advantages of the present invention will be apparent from the following detailed description of the preferred embodiments of the invention in conjunction with the accompanying drawings, in which:

FIG. 5 is a block diagram illustrating an adaptive channel equalizer of OFDM receiver according to the present invention;

FIG. 6 is a detailed diagram of a first complex multiplier illustrated in FIG. 5; and FIGS. 7A to 7G are a diagram illustrating a waveform of a signal used in the present invention.

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

First, referring to a pilot cell which are used as a reference signal for channel equalization in accordance with the present invention, the pilot cell comprises scattered pilot cells (SPC), continual pilot carriers (CPC), and transmission parameter signaling (TPS) pilots. These pilot cells are used in frame synchronization, frequency synchronization, time synchronization, channel estimation, and transmission mode identification, and it also is used to detect a phase noise. The pilot cells together with transmitted signals are comprised within an OFDM frame. For this case, a reference information value transmitted to the receiving side is known. Cells comprising the reference information value, are transmitted as 1.4 times of power level of a transmission data, that is, "boosted" power level. In an embodiment of the present invention, among other pilot cells, the SPC is defined as its reference signal.

Figure 4:
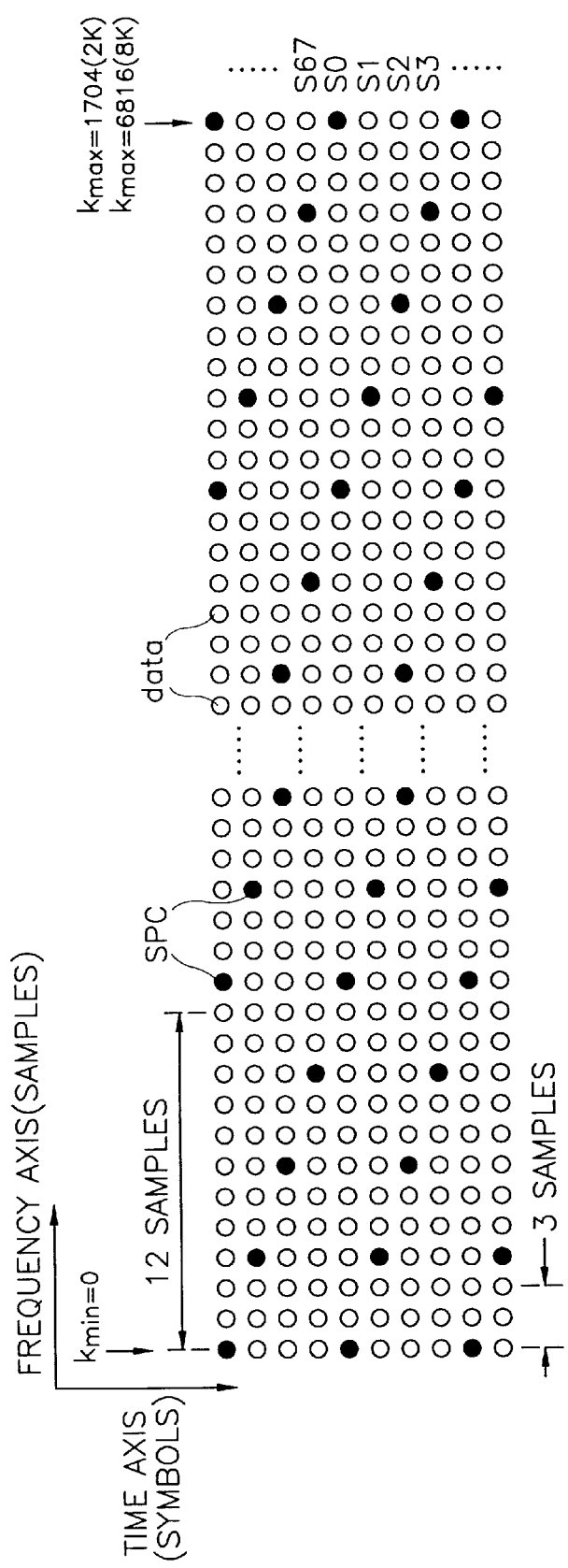
FIG. 4 is a diagram illustrating a scattered pilot cell used as a reference signal in the present invention.

FIG. 4 illustrates SPCs used for a reference signal in the present invention. $k_{max}=0$ through $k_{max}=1704$ represents the number of carriers in 2K Fast Fourier Transform (FFT) size mode, and S0, S1, S2, S3, . . . S67 represent each symbol. In addition, "DATA" represents transmitted data, and "SPC" represents a scattered pilot cell. The SPC within each symbol repeats at 12 samples, and the repeating period of the SPC within the consequent adjacent symbols differ by 3 samples.

FIG. 5 shows a block diagram illustrating an adaptive channel equalizer of OFDM receiver according to an embodiment of the present invention. In the embodiment, the adaptive channel equalizer uses least mean square algorithm. The adaptive channel equalizer comprises a first complex multiplier 511, a reference signal generator 512, an error calculator 513, a delay unit 514, a gain controller 515, a second complex multiplier 516, an adder 517, an address generator 518, a storage unit 519, a selecting signal generator 520, an initial coefficients generator 521, and a multiplexing unit 522.

The first complex multiplier 511 receives an in-phase channel signal XI, a quadrature phase channel signal XQ, and in-phase and quadrature phase filtering coefficients WI and WQ to perform a complex multiplication, and outputs a first in-phase complex multiplication signal ($C_1XI=XIWI+XQWQ$) and a first quadrature complex multiplication signal ($C_1XQ=XQWI-XIWQ$). The signals outputted from the first complex multiplier 511 are inputted into a synchronization unit (not shown) and the error calculator 513.

The reference signal generator 512 generates a reference signal RI, which is used as a pilot signal. In accordance with the embodiment of the present invention, a scattered pilot cell (SPC) signal is used as the reference signal.

The error calculator 513 receives the first in-phase and quadrature complex multiplication signals $C_1XI=XIWI+XQWQ$ and $C_1XQ=XQWI-XIWQ$ obtained in the first complex multiplier 511, receives the reference signal RI from the reference signal generator 512 to calculate an error, and outputs an in-phase error signal EI=CRI−RI and a quadrature phase error signal EQ=CRQ. Here, a pilot signal used for the reference signal is obtained from a signal modulated by a binary phase shift keying (BPSK) modulation manner at transmitting side, and it has the value of "±1(real number)" and "0(imaginary number)". Namely, an error signal EI of the in-phase is a result from subtracting the reference signal RI outputted from the reference signal generator 512 from the reference signal CRI passing through channel, and the error signal EQ of the quadrature phase is obtained by subtracting an imaginary value, which is "0", of the reference signal RI from CRQ, EQ is equivalent to CRQ.

The delay unit 514 delays the in-phase and quadrature channel signals XI and XQ, and outputs an in-phase delay signal DXI and a quadrature phase delay signal DXQ.

The gain controller 515 receives the in-phase and quadrature phase delay signals DXI and DXQ, and outputs an in-phase gain control signal $\mu$ DXI and a quadrature phase gain control signal $\mu$ DXQ. Here, a convergence constant $\mu$ of the equalizer corresponding to the gain is required for a stable convergence of the equalizer. In general, when the convergence constant $\mu$ is large, the equalizer converges faster, but runs into the risk of divergence. On the contrary, when the convergence constant $\mu$ is small, the equalizer converges slower. Accordingly, it is important to select an appropriate convergence constant $\mu$. In accordance with the embodiment of the present invention, the convergence constant $\mu$ having an approximate value of $2^n$ is selected, enabling to construct a simple hardware.

The second complex multiplier 516 receives the in-phase and quadrature phase error signals EI=CRI−RI and EQ=CRQ and the in-phase and quadrature phase gain control signals $\mu$ DXI and $\mu$ DXQ, performs the complex multiplication, and outputs a second in-phase complex multiplication signal $C_2EI=\mu[EI\cdot DXI+EQ\cdot DXQ]$ and a second quadrature phase complex multiplication signal $C_2EQ=\mu[EQ\cdot DXI-EI\cdot DXQ]$.

The adder 517 receives the second in-phase and quadrature phase complex multiplication signals $C_2EI=\mu[EI\cdot DXI+EQ\cdot DXQ]$ and $C_2EQ=\mu[EQ\cdot DXI-EI\cdot DXQ]$ from the second complex multiplier 516, and the in-phase and quadrature phase filtering coefficients WI(n) and WQ(n) from the multiplexing unit 520 or "1" and "0" when initializing, to add them, and outputs an updated in-phase filtering coefficient $WI(n+1)=WI(n)+C_2EI=WI(n)+\mu[EI\cdot DXI+EQ\cdot DXQ]$ and an updated quadrature phase filtering coefficient $WQ(n+1)=WQ(n)+C_2EQ=WQ(n)+\mu[EQ\cdot DXI-EI\cdot DXQ]$.

The address generator 518 generates and outputs a write address signal write and a read address signal read.

The storage unit 519 stores the updated filtering coefficients WI(n+1) and WQ(n+1) according to the write address signal write, and outputs the updated filtering coefficients WI(n+1) and WQ(n+1) according to the read address signal read.

The selecting signal generator 520 generates a selecting signal according to a symbol sync signal. Since there is no coefficient when the equalizer operates at the first stage, the selecting signal is "low (0)" in order to select the initial coefficients ("1" and "0") until the first 4 symbols are passed through, and the selecting signal is "high (1)" for selecting the updated filtering coefficients when all the first 4 symbols are passed through.

The initial coefficients generator 521 generates the initial coefficients "1 (the part of real number)" and "0(the part of imaginary number)".

The multiplexing unit 522 selects one of the initial coefficients ("1" and "0") from the initial coefficients generator 521 and the updated filtering coefficients from the storage unit 519, according to the selecting signal from the selecting signal generator 520, and feeds back the selected coefficients to the first complex multiplier 511 and the adder 517.

FIG. 6 is a detailed diagram of a first complex multiplier 511 illustrated in FIG. 5. The first complex multiplier 511 comprises a first Finite Impulse Response (FIR) filter 61, a second FIR filter 62, a third FIR filter 63, a fourth FIR filter 64, an adder 65, and a subtracter 66.

The first FIR filter 61 receives the in-phase channel signal XI and the in-phase filtering coefficient WI and outputs a first filtering signal XI•WI. The second FIR filter 62 receives the in-phase channel signal XI and the quadrature phase filtering coefficient WQ and outputs a second filtering signal XI•WQ. The third FIR filter 63 receives the quadrature phase channel signal XQ and the quadrature phase filtering coefficient WQ and outputs a third filtering signal XQ•WQ. The fourth FIR filter 64 receives the quadrature phase channel signal XQ and the in-phase filtering coefficient WI and outputs a fourth filtering signal XQ•WI.

The adder 65 receives the first filtering signal XI•WI from the first FIR filter 61 and the third filtering signal XQ•WQ from the third FIR filter 63 and outputs an addition signal $C_1XI=XIWI+XQWQ$. The subtracter 66 receives the second filtering signal XI•WQ from the second FIR filter 62 and the fourth filtering signal XQ•WI from the fourth FIR filter 64 and outputs a subtraction signal $C_1XQ=XQWI-XIWQ$.

Figure 1:
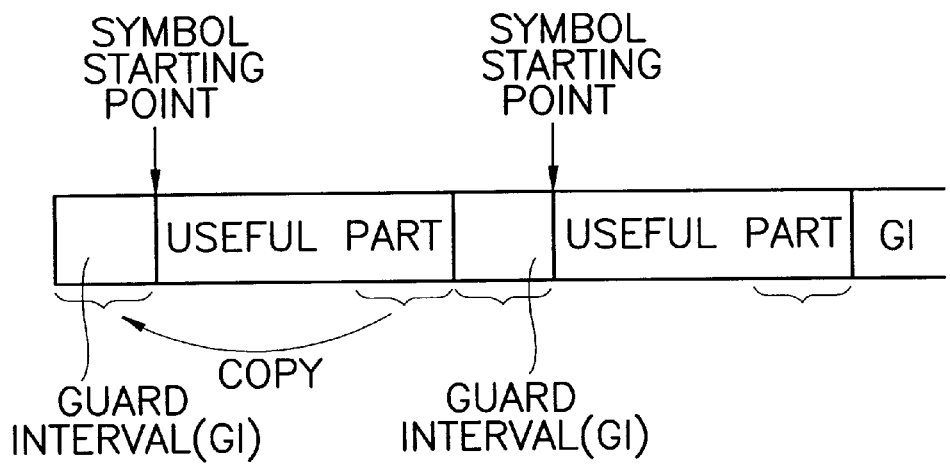
FIG. 1 shows a format diagram of a transmission symbol having the guard interval in an OFDM communication system.
Figure 2:
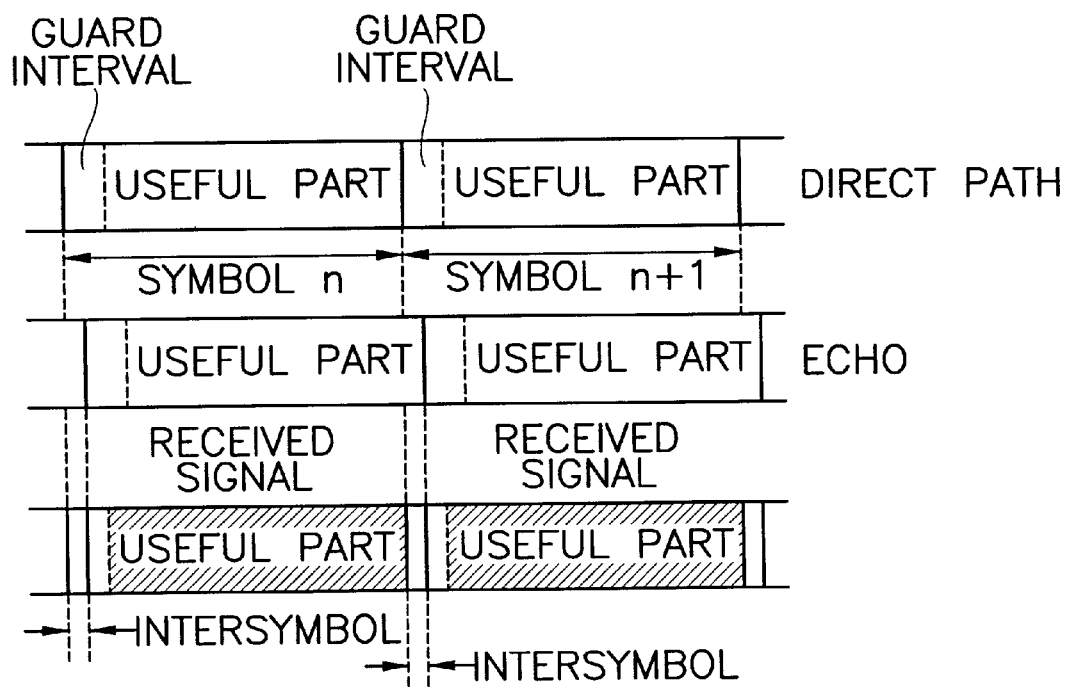
FIG. 2 is a diagram used for explaining removal of inter-symbol interference by inserting the guard interval.
Figure 3A:
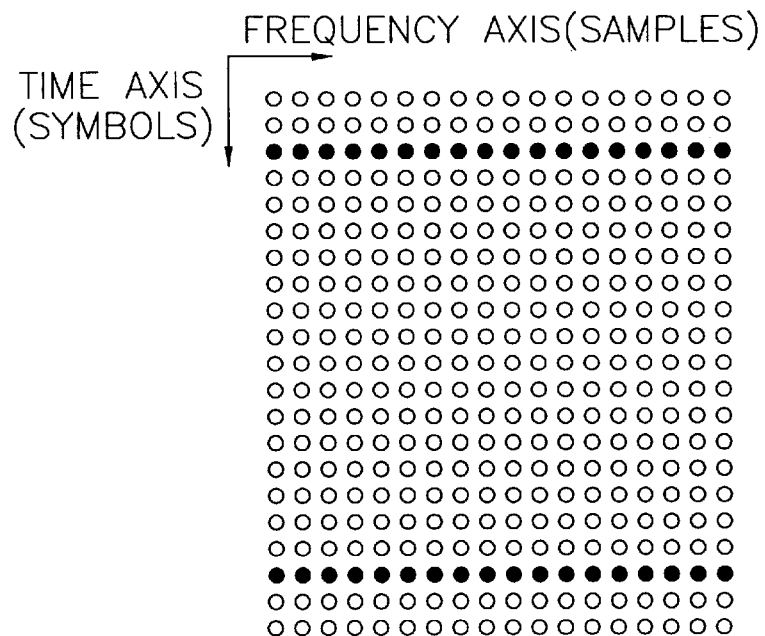
FIGS. 3A to 3B are frame structural diagrams for describing a channel equalization method according to a conventional pilot symbol insertion method.
Figure 3B:
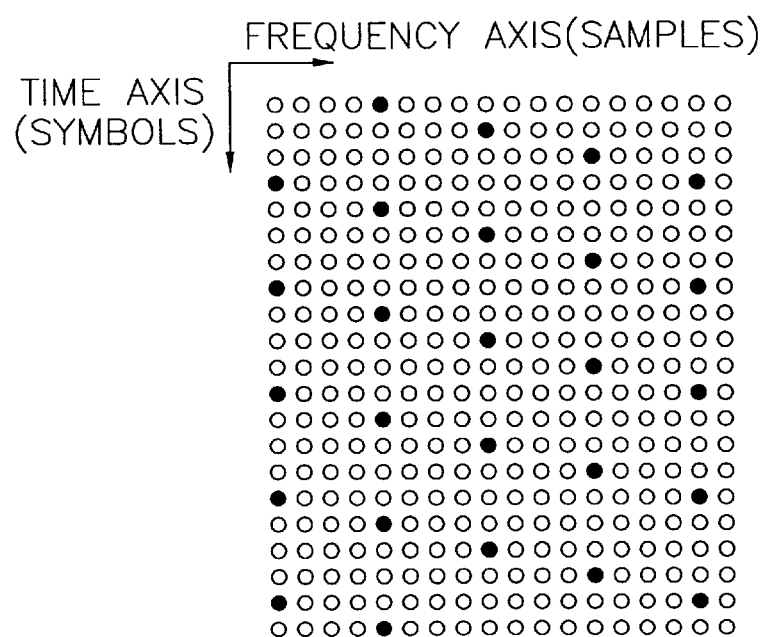

As shown in FIG. 2, in OFDM communication system, the ISI caused by a multi-path transmission is removed by inserting guard intervals. Accordingly, in the embodiment of the present invention, only one tap is required for the first complex multiplier 511 necessary for removing the interference between samples within symbol. Correspondingly, as described in detail for the first complex multiplier 511 of FIG. 5, one tap is sufficient for the first FIR filter 61, the second FIR filter 62, the third FIR filter 63, and the fourth FIR filter 64.

FIGS. 7A to 7G illustrate a waveform of a signal used in the present invention. FIG. 7A represents a frame sync signal, and in this case, one frame comprises 68 symbols $S_0$ through $S_{67}$. FIG. 7B represents the symbol sync signal, which corresponds to the signal inputted in the selecting signal generator 520 illustrated in FIG. 5, and in case of 2K FFT size mode, one symbol is comprised of 2560 samples, in which useful part has 2048 samples and guard interval has 512 samples. FIG. 7C represents the SPC signal of the first symbol $S_0$. FIG. 7D represents the SPC signal of the second symbol $S_1$. FIG. 7E represents the SPC signal of the third symbol $S_2$. FIG. 7F represents the SPC signal of the fourth symbol $S_3$. FIG. 7G represents the selecting signal inputted in the multiplexing unit 522 illustrated in FIG. 5. Here, describing FIGS. 7C to 7F by referring to FIG. 4, a difference between continuous SPC signals within one symbol is by 12 samples, and a difference of the SPC signals between adjacent symbols is by 3 samples.

Next, referring to FIGS. 5 to 7, an operation of the adaptive channel equalizer of the present invention will be described in detail.

Referring to FIG. 5, first, when the OFDM receiver is turned on, the symbol sync signal (FIG. 7B) and a reset signal are inputted in the selecting signal generator 520, and the inputted symbol sync signal is counted in the selecting signal generator 520. The selecting signal is outputted as "low" from the selecting signal generator 520 until four symbols $S_0$, $S_1$, S2, and $S_3$ are inputted. When the "low" selecting signal from the selecting signal generator 520 is inputted in the multiplexing unit 522, the multiplexing unit 522 selects the initial coefficients "1" (the part of real number) and "0" (the part of imaginary number) from the initial coefficients generator 521. The initial coefficients are selected instead of the updated coefficients since there is no the updated coefficients when operating the equalizer at the initializing stage. The initial coefficient "1" selected in the multiplexing unit 522 is inputted in the first complex multiplier 511 instead of the in-phase filtering coefficient WI. Another initial coefficient "0" selected in the multiplexing unit 522 is inputted in the first complex multiplier 511 instead of the quadrature phase filtering coefficient WQ. In addition, the received in-phase and quadrature phase channel signals XI and XQ are inputted in the first complex multiplier 511.

When the in-phase channel signal XI and the initial coefficient "1" inputted in the first complex multiplier 511 are inputted in the first FIR filter 61, only the in-phase channel signal XI is outputted. When the quadrature phase channel signal XQ and the initial coefficient "0" inputted in the first complex multiplier 511 are inputted in the third FIR filter 63, only "0" is outputted. When the in-phase channel signal XI and the initial coefficient "0" inputted in the first complex multiplier 511 are inputted in the second FIR filter 62, only "0" is outputted. When the quadrature phase channel signal XQ and the initial coefficient "1" inputted in the first complex multiplier 511 are inputted in the fourth FIR filter 64, only the quadrature phase channel signal XQ is outputted. The adder 66 receives the output signal XI from the first FIR filter 61 and the output signal 0 from the third FIR filter 63 to add them, and in this case, an added result $C_1$XI is equal to the in-phase channel signal XI. Accordingly, the signal outputted from the first complex multiplier 511 becomes the in-phase and quadrature phase channel signals XI and XQ.

Meanwhile, referring back to FIG. 5, when a fifth symbol sync signal (FIG. 7B) is generated, after the selecting signal generator 520 counts continuously the symbol sync signal and all four symbols $S_0$, $S_1$, $S_2$, and $S_3$, are inputted, the selecting signal (FIG. 7G) from the selecting signal generator 520 is outputted as "high". When the "high" selecting signal from the selecting signal generator 520 is inputted in the multiplexing unit 522, the multiplexing unit 522 selects the in-phase and quadrature phase filtering coefficients WI and WQ from the storage unit 519. The selected in-phase and quadrature phase filtering coefficients WI and WQ are inputted in the first complex multiplier 511 and the adder 517.

The first complex multiplier 511 receives the received in-phase and quadrature phase channel signal XI and XQ, and the selected in-phase and quadrature phase filtering coefficients WI and WQ. Namely, the first filtering signal XI•WI is outputted after the in-phase channel signal XI and the in-phase filtering coefficient WI are inputted in the first FIR filter 61. The second filtering signal XI•WQ is outputted after the in-phase channel signal XI and the quadrature phase filtering coefficient WQ are inputted in the second FIR filter 62. The third filtering signal XQ•WQ is outputted after the quadrature phase channel signal XQ and the quadrature phase filtering coefficient WQ are inputted in the third FIR filter 63, and the fourth filtering signal XQ•WI is outputted after the quadrature phase channel signal XQ and the in-phase filtering coefficient WI are inputted in the fourth FIR filter 64. When the first filtering signal XI•WI from the first FIR filter 61 and the third filtering signal XQ•WQ from the third FIR filter 63 are inputted in the adder 65 for adding them, the addition signal, namely the first in-phase complex multiplication signal $C_1$XI=XIWI+XQWQ is outputted. When the second filtering signal XI•WQ from the second FIR filter 62 and the fourth filtering signal XQ•WI from the fourth FIR filter 64 are inputted in the subtracter 66 for subtracting them, the subtraction signal, namely the first quadrature phase complex multiplication signal $C_1$XQ= XQWI−XIWQ is outputted. Accordingly, the first in-phase complex multiplication signal $C_1$XI=XIWI+XQWQ and the first quadrature phase complex multiplication signal $C_1$XQ= XQWI−XIWQ outputted from the first complex multiplier 511 are inputted in the synchronization unit (not shown) and to the error calculator 513.

When the SPC signal SPC corresponding to the reference signal RI is outputted from the reference signal generator 512, the reference signal RI is inputted in the error calculator 513. The error calculator 513 receives the first in-phase complex multiplication signal $C_1$XI=XIWI+XQWQ and the first quadrature phase complex multiplication signal $C_1$XQ= XQWI−XIWQ outputted from the first complex multiplier 511, and the reference signal RI outputted from the reference signal generator 512, calculates the error, and outputs the in-phase error signal EI=CRI−RI and the quadrature phase error signal EQ=CRQ.

In addition, the delay unit 514 receives the in-phase channel signal XI and the quadrature phase channel signal XQ, delays them, and outputs the in-phase delay signal DXI and the quadrature phase delay signal DXQ. The gain controller 515 receives the in-phase and quadrature phase delay signals DXI and DXQ, controls their gains, and outputs the in-phase gain control signal $\mu$ DXI and the quadrature gain control signal $\mu$ DXQ.

The second complex multiplier 516 receives the in-phase and quadrature error signals EI=CRI−RI and EQ=CRQ outputted from the error calculator 513 and the in-phase and quadrature gain control signals $\mu$ DXI and $\mu$ DXQ outputted from the gain controller 515, performs the complex multiplication for them, and outputs the second in-phase complex multiplication signal $C_2$EI=$\mu$[EI•DXI+EQ•DXQ] and the second quadrature phase complex multiplication signal $C_2$EQ=$\mu$[EQ•DXI−EI•DXQ]. The adder 517 receives the second in-phase and quadrature phase complex multiplication signals $C_2$EI=$\mu$[EI•DXI+EQ•DXQ] and $C_2$EQ=$\mu$ [EQ•DXI−EI•DXQ] outputted from the second complex multiplier 516 and the in-phase and quadrature phase coefficients WI(n) and WQ(n) selected in the multiplexing unit 520, adds them, and outputs the updated in-phase coefficient WI(n+1)=WI(n)+$\mu$[EI•DXI+EQ•DXQ] and the updated quadrature phase coefficient WQ(n+1)=WQ(n)+$\mu$[EQ•DXI−EI•DXQ].

When the write address signal write generated from the write address generator 518 is sent to the storage unit 519, to output the updated coefficients, the storage unit 519 stores the updated in-phase and quadrature phase coefficients WI(n+1)=WI(n)+$\mu$[EI•DXI+EQ•DXQ] and WQ(n+1)=WQ (n)+$\mu$[EQ•DXI−EI•DXQ] outputted from the adder 517. When the read address signal read generated from the address generator 518 is sent to the storage unit 519, to output the stored coefficients, the storage unit 519 outputs the updated in-phase and quadrature phase coefficients WI(n+1)=WI(n)+$\mu$[EI•DXI+EQ•DXQ] and WQ(n+1)=WQ(n)+$\mu$[EQ•DXI−EI•DXQ] to the multiplexing unit 522. Finally, the updated coefficients inputted in the multiplexing unit 522 are selected by the selecting signal outputted from the selecting signal generator 520, and are fed back to the first complex multiplier 511 and the adder 517, to repeat the above described process.

As described above, the adaptive channel equalizer of the present invention can efficiently remove intra-symbol interference, even at presence of abrupt changes in the channel environment, by updating the in-phase and quadrature phase filtering coefficients by utilizing the pilot signal, in the OFDM receiver utilizing multi-carriers.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. An adaptive channel equalizer for use in a digital communication system utilizing OFDM method, comprising:

first complex multiplying means for outputting a first in-phase complex multiplication signal and a first quadrature phase complex multiplication signal by performing a complex multiplication for received in-phase and quadrature phase channel signals and the in-phase and quadrature phase coefficients;

reference signal generating means for generating a reference signal;

error calculating means for outputting an in-phase error signal and a quadrature phase error signal by calculating a phase error from the first in-phase and quadrature phase complex multiplication signals and the reference signal;

delaying means for outputting an in-phase delay signal and a quadrature phase delay signal by delaying the in-phase and quadrature phase channel signals;

gain controlling means for outputting an in-phase gain control signal and a quadrature phase gain control signal by controlling a gain of the in-phase and quadrature phase delay signals;

second complex multiplying means for outputting a second in-phase complex multiplication signal and a second quadrature phase complex multiplication signal by performing a complex multiplication for the in-phase and quadrature phase error signals, and the in-phase and quadrature phase gain control signals;

adding means for outputting updated in-phase and quadrature phase coefficients after adding respectively the second in-phase and quadrature phase complex multiplication signals and the in-phase and quadrature phase coefficients;

address generating means for generating a write address signal and a read address signal;

storing means for storing the updated in-phase and quadrature phase coefficients according to the write address signal, and outputting the updated coefficients stored according to the read address signal;

initial coefficients generating means for generating an initial coefficients;

selecting signal generating means for generating a selecting signal according to a symbol sync signal; and multiplexing means for selecting one of the initial coefficients from said initial coefficients generating means and the updated coefficients from said storing means according to the selecting signal, to supply said first complex multiplying means as the in-phase and quadrature phase coefficients.

2. The adaptive channel equalizer of claim 1, wherein said first complex multiplying means comprises:

a first FIR filter for outputting a first filtering signal by filtering the in-phase channel signal as the in-phase coefficient;

a second FIR filter for outputting a second filtering signal by filtering the in-phase channel signal as the quadrature phase coefficient;

a third FIR filter for outputting a third filtering signal by filtering the quadrature phase channel signal as the quadrature phase coefficient;

a fourth FIR filter for outputting a fourth filtering signal by filtering the quadrature phase channel signal as the in-phase coefficient;

an adder for adding the first filtering signal to the third filtering signal; and a subtracter for subtracting the second filtering signal from the fourth filtering signal.

3. The adaptive channel equalizer of claim 2, wherein each of said first to fourth FIR filters is implemented by 1 tap.

4. The adaptive channel equalizer of claim 1, wherein the reference signal generated from said reference signal generating means is a SPC signal.

5. The adaptive channel equalizer of claim 1, wherein said selecting signal generating means counts symbols according to the symbol sync signal, outputs the selecting signal for selecting the initial coefficients until fourth symbol, whereas outputs the selecting signal for selecting the updated coefficients beginning with fifth symbol.

* * * * *